Patented July 1, 1952

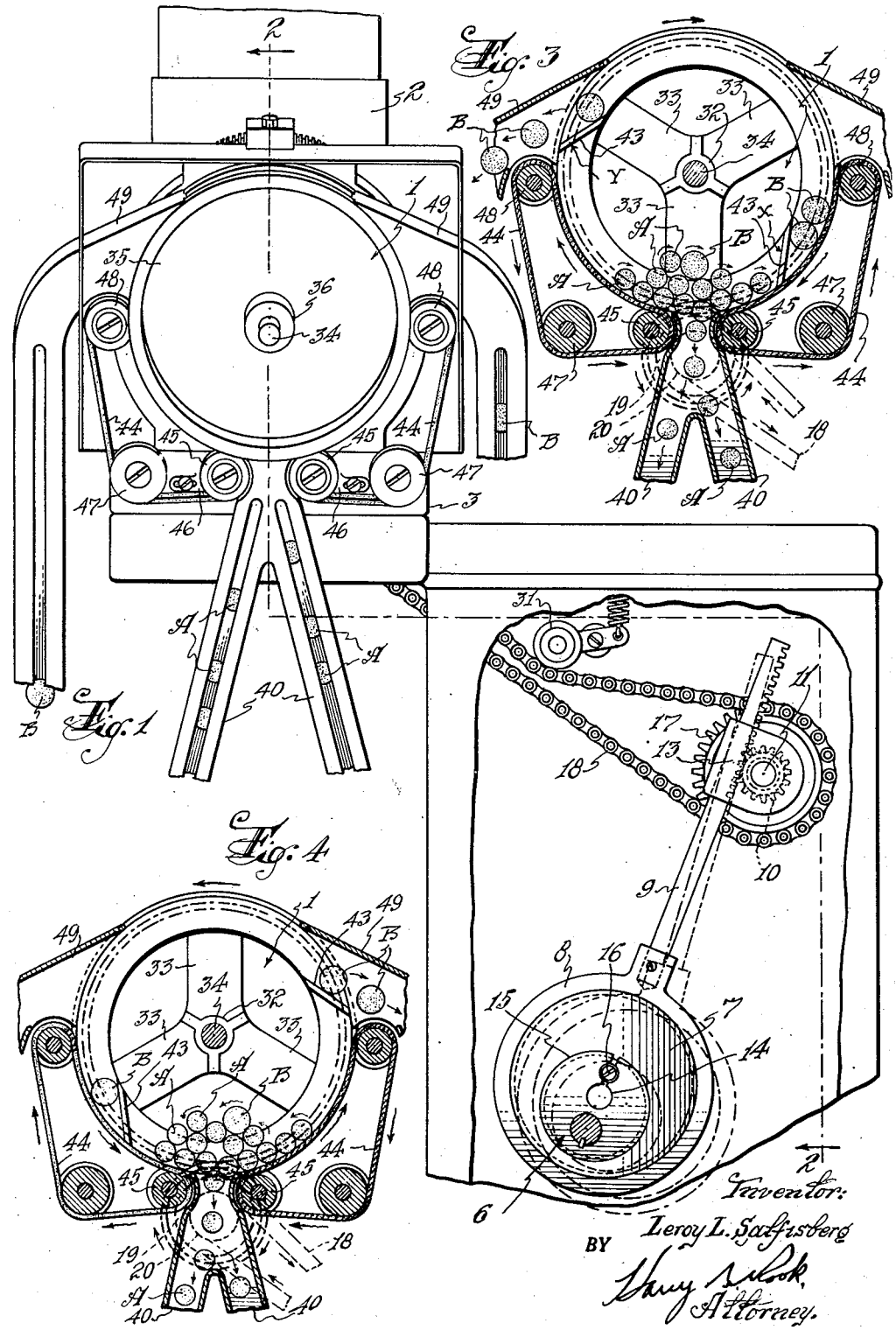

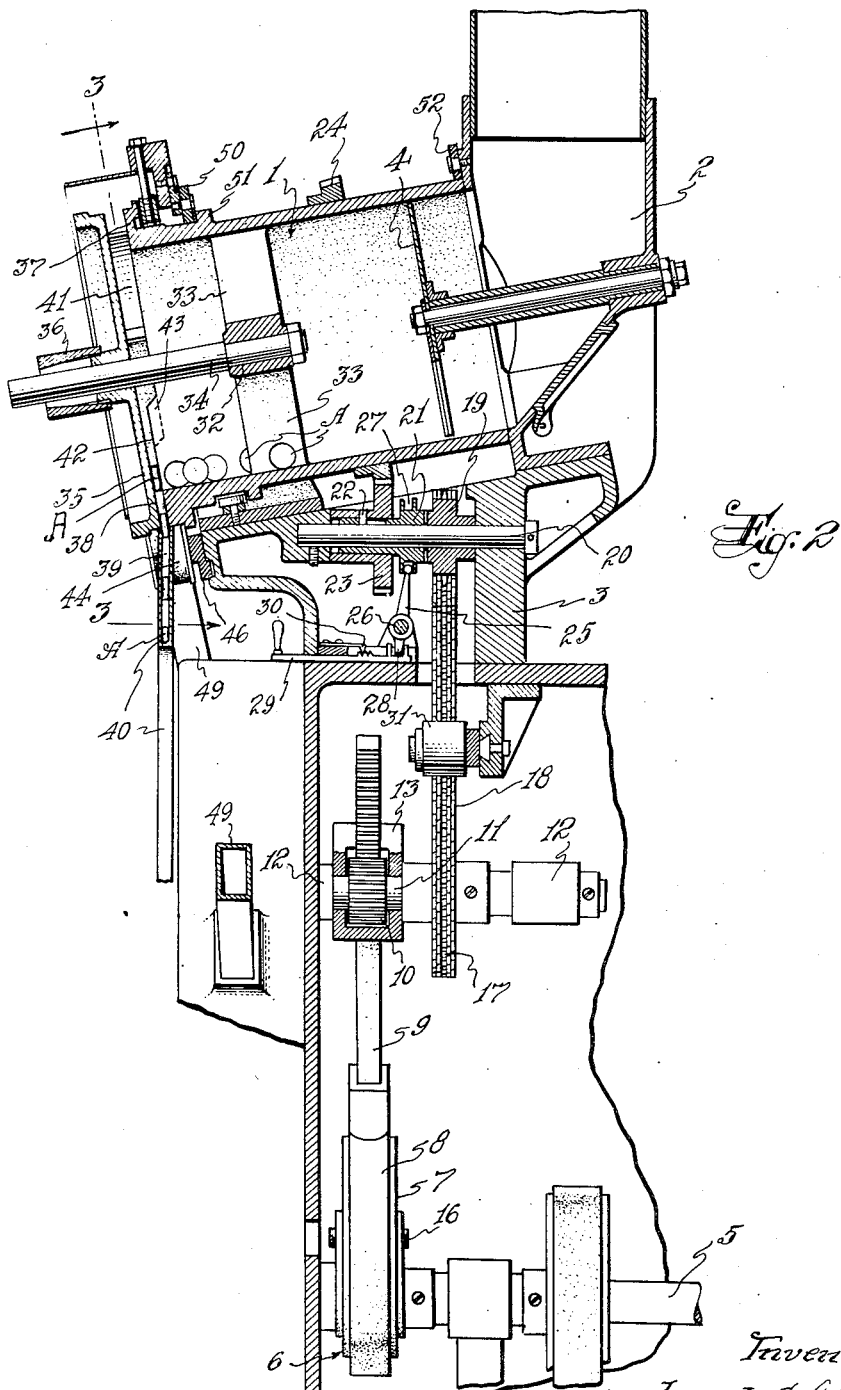

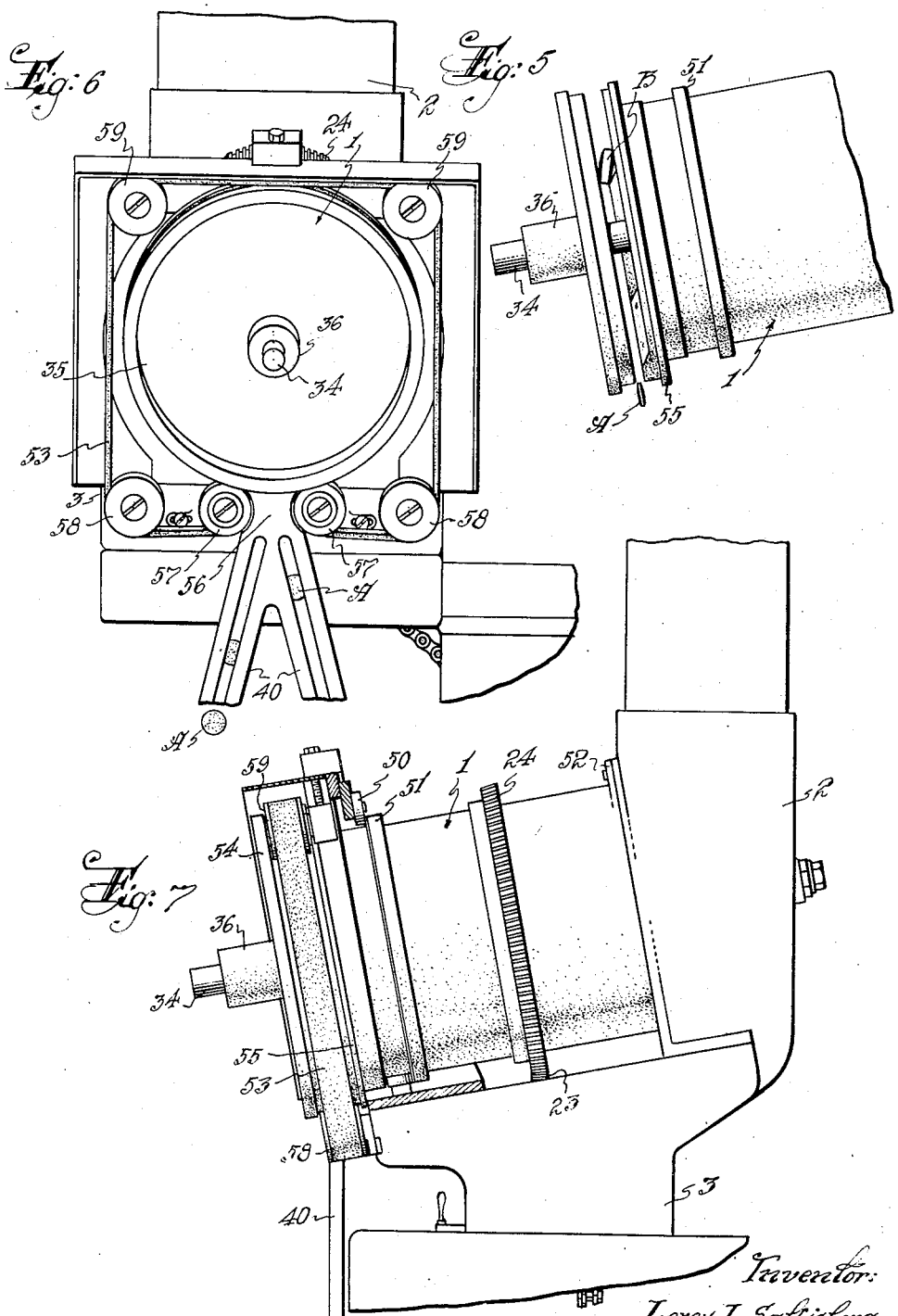

2,601,920

UNITED STATES PATENT OFFICE 2,601,920

ARTICLE GAUGING AND SORTING MECHANISM

Leroy L. Salfisberg, South Orange, N. J., assignor to Ivers-Lee Company, Newark, N. J., a corporation of Delaware Application February 3, 1950, Serial No. 142,099

5 Claims. (Cl. 209—83)

This invention relates in general to apparatus for feeding articles, particularly small articles such as tablets, wafers or the like, from a hopper to any desired point, for example to mechanism for packaging the articles; and more particularly the invention contemplates a machine of the type described in my United States Patent No. 1,476,222.

Machines of this type include a hopper from which the articles are fed by gravity into a drum where the articles are agitated and directed to a discharge chute.

Prime objects of the present invention are to provide novel and improved means for agitating the articles in the drum so as to facilitate their deposit into the discharge chute; and thus to oscillate the drum back and forth about its axis so as to more expeditiously and accurately direct the articles into the discharge chute.

Another object of the invention is to provide in such an article feeding apparatus, novel and improved means for ejecting from the drum abnormal articles, for example articles that are oversize, thereby to eliminate the possibility of such abnormal articles clogging the discharge chute or interfering with the movement of the normal articles to the chute.

Further objects are to provide simple, inexpensive and reliable mechanism for oscillating the drum of the article feeding apparatus and to provide such drive mechanism which shall be easily and quickly adjustable to vary the extent of oscillation. Other objects, advantages and results of the invention will be brought out by the following description in conjunction with the accompanying drawings, in which—

Figure 1 is a front elevational view of article feeding apparatus embodying the invention, with portions broken away;

Figure 2 is a vertical longitudinal sectional view approximately on the plane of the line 2—2 of Figure 1;

Figure 3 is a fragmentary transverse vertical sectional view approximately on the plane of the line 3—3 of Figure 2 showing the article ejecting mechanism in one position;

Figure 4 is a similar view showing the article ejecting mechanism in the opposite condition;

Figure 5 is a fragmentary side elevational view of the article conveying drum with the ejector chute and driving belts removed;

Figure 6 is a fragmentary front elevational view of a modification of the invention; and Figure 7 is a side elevational view of the form of the invention shown in Figure 6 with portions broken away and shown in section.

Specifically describing the embodiment of the invention illustrated in Figures 1 to 5, inclusive, the articles to be packaged are shown in the form of tablets of which there are some of normal size designated A and some of abnormal size designated B, disposed in the article conveying drum 1, having been discharged into one end of the conveying drum by action of gravity from a hopper 2, as best shown in Figures 2 and 3. The drum 1 is rotatably mounted on the frame 3 of the apparatus. An adjustable partition 4 is mounted adjacent the inlet end of the drum on the wall of the hopper for controlling the movement of articles passing from the hopper to the interior of the drum 1, this partition being identical with that shown in my Patent No. 1,476,222.

The article conveying drum 1 is arranged with its longitudinal axis inclined with respect to the axis of the hopper 2 so that there will be sufficient pitch to permit movement of the articles or tablets through the drum by gravity. In accordance with the invention, the drum is oscillated or rotated alternately in opposite directions about its axis so as to keep the tablets or articles in motion, and as shown, the driving means includes a drive shaft 5 driven from any suitable source of power and on which is keyed an eccentric driving element 6 which is encircled by a motion transmitting eccentric 7 which has a circular opening 15 to receive the eccentric element 6 and is associated with a strap 8 in the usual manner. The strap carries a rack bar 9 which meshes with a pinion 10 that is fast connected to a countershaft 11 journaled in bearings 12 in the machine frame. The rack is guided for reciprocation by a guide block 13 which is swingably mounted on the shaft 11. The eccentric driving element 6 is split at 14 and is of a normal exterior diameter to loosely fit within the eccentric opening 15 in the motion transmitting eccentric 7, whereby said two eccentric elements can be adjusted relatively to each other to vary the stroke of the rack bar 9. After the desired adjustment has been made, the driving element 6 is expanded into tight engagement with the walls of the opening 15 by a tapered screw plug 16 which spreads the driving element 6 at opposite sides of the split 14. With this construction, it will be observed that after the two eccentric elements 6 and 7 have been relatively adjusted and fastened together to produce the desired stroke, rotation of the shaft 5 will cause reciprocation of the rack bar 9 and oscillation or rotation alternately in opposite directions of the countershaft 11.

The countershaft 11 has a driving connection with the drum 1, and as shown, this driving connection comprises a sprocket 17 on the countershaft that is connected by a chain 18 through a sprocket 19 rotatable on a jack shaft 20 journaled in the frame 3 beneath the drum. One side of the sprocket 19 has a clutch face which cooperates with the face of a clutch sleeve 21 that is connected by a pin 22 to a gear 23 which meshes with a ring gear 24 secured to the drum 1 in encircling relation thereto so that when the clutch sleeve 21 is in engagement with the sprocket 19, motion will be transmitted from the sprocket through the clutch sleeve 21, gears 23 and 24 to the drum.

Any suitable means may be utilized for sliding the clutch sleeve 21, but as shown, a clutch lever 25 is pivotally mounted intermediate its ends on the frame as indicated at 26 and has one end fitted in a groove 27 in the clutch sleeve and its other end pivotally connected at 28 to one end of a slide rod 29 with which cooperates a spring pawl 30 for holding the rod with the clutch in open and closed positions. A suitable chain tightening pulley 31 is preferably provided to maintain the chain in taut condition.

Secured to the inner surface of the drum is a spider member having a central hub 32 and radiating arms 33, and mounted on the hub is a cover supporting rod 34 which carries adjacent its exterior end a cover plate 35 slidably arranged on the rod 34 and held in any desired position longitudinally of the rod by any suitable mechanism such as a clamping nut 36.

At its end adjacent the cover 35 the drum 1 has a flanged portion 37 extending an appreciable distance beyond the inner periphery of the opening at the end of the drum and forming with the cover 35 a periphery arranged tablet or article receiving channel 38 communicating with an article or tablet guiding throat 39 which leads to article guide chutes 40 which direct the articles to the desired point, for example to packaging apparatus as shown, for example in my United States Patent No. 2,374,504.

In operation, the tablets or articles are delivered from the first hopper 2 into the oscillating drum 1 through which they move as the result of the oscillation and gravitational force toward the discharge end and into the above-mentioned periphery arranged channel 38 where, if desired, they assume a nearly vertical position, from where they drop by gravity singly into the chute 39, as shown in Figures 2 and 3.

With feeding apparatus of the character described, means is provided for keeping the tablets or articles in motion so that the feeding operation may be uninterrupted by congestion or constriction at any point, and particularly at the inlet or mouth of the throat 39 where said throat communicates with the article guiding channel 38. For this purpose two endless belts 44 engage the peripheries of the flange 37 and the cover plate 35 and overlie that portion of the peripheral opening between said flange 37 and the cover plate 35 below the axis of the drum, except that zone of said peripheral opening which leads into the throat 39. At each side of this zone is a roller 45 journaled on an adjustable bracket 46 on the frame 3, and each belt 44 passes around one of these rollers and around other rollers 47 and 48 the latter of which are located above the level of the mass of articles in the drum 1.

With this construction it will be observed that the belts 44 will be frictionally driven by and moved with the drum 1 and will prevent articles from falling from the channel 38 except at the mouth of the chute 39.

The cover 35 is adjusted relatively to the peripheral flange 37 to permit feeding of articles of various sizes and shapes, and after the cover has been set for an article of a given size and shape, articles of larger sizes or abnormal shapes cannot pass freely into the peripheral channel 38 or into the chute 39, but when such abnormal or oversized articles such as indicated at B are present in the conveying drum 1, as is often the case, they usually clog the chute and interfere with the proper discharge and feed of the normal articles A. Therefore, another feature of the invention is the provision of means for automatically ejecting such abnormal articles, and as shown the flange 37 at the end of the drum for approximately one-half of the diameter of the drum is located in a plane that is disposed inwardly of the drum as indicated at 41 beyond the plane of the other portion of the end surface of the drum that is designated 42, whereby the channel formed between the cover 35 and the surface 41 of the drum is wider than the channel 38 between the cover 35 and the surface 42 of the drum and of sufficient width to permit free passage therethrough of the largest articles that it may be desired to eject. This construction provides a beveled shoulder 43 at each of the two zones of juncture of the surfaces 41 and 42 so that upon oscillation of the drum, each shoulder will at one limit of oscillation be moved into the mass of tablets as indicated at X in Figures 3 and 4 while at the other limit of oscillation the shoulder will be raised out of and above the mass of articles as shown at Y in Figures 3 and 4. When the shoulder is in the mass of articles, the larger articles may drop by gravity into the channel between the cover plate and the surface 41 as shown at the right hand side of Figure 3 and at the left hand side of Figure 4, and as the shoulder is elevated to the position Y, the article will be raised and dropped by gravity out of the channel as shown at the left hand side of Figure 3 and at the right hand side of Figure 4. The articles will then fall by gravity down the inclined shoulders 43 and into the discharge chutes 49, the portions of the belts 44 that pass over the rollers 48 frictionally impelling the tablets into the chutes.

The drum may be mounted for rotation in any suitable manner, but as shown it is supported on a plurality of roller bearings including forward bearings 50 engaging a peripheral flange 51 on the drum and rear bearings 52 engaging the peripheral surface of the drum adjacent its intake end.

The belts 44 may be maintained taut by any suitable mechanism which forms no part of the present invention.

Unexpectedly the oscillating or back and forth rotation of the drum 1 facilitates the "lining up" of the articles in the channel 38 so that a more continuous and even discharge of the articles is obtained than is possible with the rotating drum shown in my earlier patents. Moreover, the abnormal articles are efficiently and automatically ejected during the agitation and "lining up" of the normal articles so that interference of the feeding of the normal articles by abnormal articles is reduced to the minimum.

A modification of the invention is shown in Figures 6 and 7. In this form of the invention the article ejecting mechanism is omitted and a single belt 53 passes around all portions of the peripheries of the cover plate 54 and the flange 55 of the drum except those portions adjacent the throat 56 which is identical with the throat 39; and the belt is supported by rollers 57 corresponding to the rollers 45, plus rollers 58 and 59 which may be adjustably supported on the frame of the machine in the same manner as the belt is supported in the machine shown in my Patent No. 1,476,222, or by any other suitable means.

The drum is driven by the same mechanism that has been hereinbefore described so that the drum is oscillated or rotated alternately in opposite directions.

Having thus described the invention, what I claim is:

1. Article feeding mechanism including a rotary article conveying drum having an article receiving channel at one end one side wall of which comprises a portion of the face of a peripheral flange at said end of the drum that is in a plane perpendicular to the axis of the drum, said channel being of a size and shape to receive articles of a given size, said face of said flange having another portion the plane of which is parallel to but offset from the first plane to form a channel above the first-named channel to freely receive articles incapable of freely entering the first-named channel, there being a shoulder at the juncture of said two portions of said flange and there being also a discharge passage leading from said channel for the second-named articles, and means for rotating said drum so that said shoulder will lift the second-named articles through the second-named channel and said discharge passage.

2. Article feeding mechanism comprising an article carrying drum mounted to rotate on an inclined axis and having a peripheral concentric arcuate article guiding channel at its lower discharge end greater in diameter than the interior of the drum, there being an article delivery opening leading from said channel, means for rotating the drum alternately in opposite directions to move the articles from the drum into said channel, said channel and said article delivery opening being of a size and shape to freely receive articles of a given size or shape, and means for ejecting from said drum articles of a size and shape incapable of freely entering said channel and including a channel capable of receiving the second-mentioned articles and communicating with each end of the first-named channel and having a discharge opening, and means for ejecting the second-named articles from the second-named channels through the respective discharge openings.

3. Article feeding mechanism as defined in claim 2, wherein the last-named means includes a shoulder on said drum projecting into each of the last-named two channels for ejecting the second-named articles from said last-named two channels through the respective discharge opening.

4. Article feeding mechanism comprising an article carrying drum mounted to rotate on an inclined axis and having a peripheral concentric arcuate article guiding channel at its lower discharge end greater in diameter than the interior of the drum, means for rotating the drum alternately in opposite directions to move the articles from the drum into said channel, said channel and said article delivery opening being of a size and shape to freely receive articles of a given size or shape, one side wall of said channel comprising a portion of a peripheral flange on the end of said drum and there being an article delivery opening leading from said channel, means for ejecting from said drum articles of a size and shape incapable of freely entering said channel, said means including a channel capable of receiving the second-mentioned articles and communicating with each end of the first-named channel and having a discharge opening, one side wall of each of the second-named two channels also comprising a peripheral portion of said flange, and means on said drum projecting into the second-named channels for ejecting the second-named articles from the second-named two channels through the respective discharge opening.

5. Article feeding mechanism as defined in claim 4, wherein the last-named means comprises shoulders at the junctures of the first and second-mentioned portions of said flange.

LEROY L. SALFISBERG.

REFERENCES CITED

The following references are of record in the file of this patent:

UNITED STATES PATENTS

| Number | Name | Date |
| --- | --- | --- |
| 1,033,291 | Thomas | July 23, 1912 |
| 1,456,546 | Gleason | May 29, 1923 |
| 1,476,222 | Salfisberg | Dec. 4, 1923 |
| 1,485,895 | Thompson | Mar. 4, 1924 |
| 1,623,066 | Nordstrom | Apr. 5, 1927 |
| 1,813,254 | Perkins | July 7, 1931 |